Figure 5:
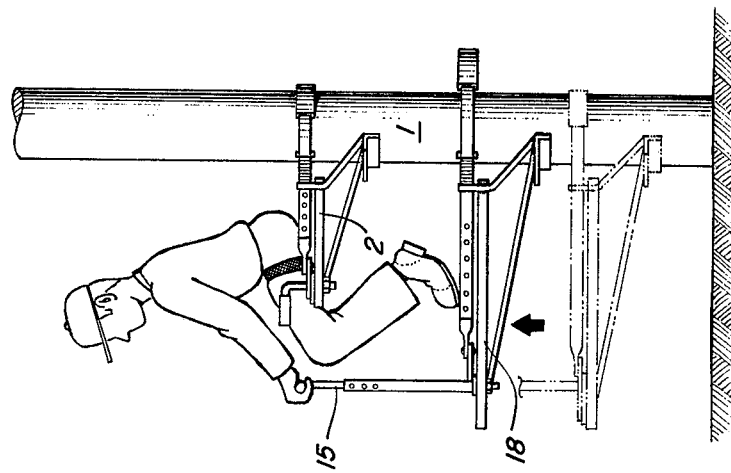

United States Patent [19]

Strode

[11] 4,244,445
[45] Jan. 13, 1981

[54] SUPPORT PLATFORM FOR VERTICAL POLES OR TREES

[76] Inventor: Clarence A. Strode, 214 S. Eleventh St., Ponca City, Okla. 74601

[21] Appl. No.: 31,001

[22] Filed: Apr. 18, 1979

[51] Int. Cl.³ .............................. A45F 3/26; A47C 9/10
[52] U.S. Cl. ....................................... 182/136; 182/187
[58] Field of Search .......................... 182/187, 133–136; 248/230; 108/151

[56] References Cited

U.S. PATENT DOCUMENTS

| | | | |
|---|---|---|---|
| 1,187,078 | 6/1916 | May | 248/230 |
| 2,991,842 | 7/1961 | Hardin | 182/187 |
| 3,338,332 | 8/1967 | Brantly | 108/151 |
| 3,460,649 | 8/1969 | Baker | 182/134 |
| 3,960,240 | 6/1976 | Cotton | 182/187 |
| 4,168,765 | 9/1979 | Ferguson | 182/135 |

*Primary Examiner*—Reinaldo P. Machado
*Attorney, Agent, or Firm*—Cortlan R. Schupbach, Jr.

[57] ABSTRACT

An apparatus is provided for use on substantially vertical poles comprising two sections which cooperate in ascending and descending said vertical poles, comprising (a) an upper section comprising a seat member having a handle member attached thereto; a gripping means removably and adjustably secured to said seat member; a brace member supporting said seat member, attached at one end to the underside of the seat member and at the opposite end contacting said pole, whereby application of force to the seat member increases the contact of the support member with said pole; and (b) a lower section comprising a foot platform having handle members attached thereto; gripping means removably and adjustably secured to said foot platform; and a brace member attached at one end beneath said platform and at the opposite end in contact with the pole, whereby application of force to the foot platform increases the grip of the brace member on said pole; whereby the pole is ascended by drawing the lower section to a convenient height below the seat section, then standing on said lower section and raising said seat section to a convenient height and repeating the process until the desired height is reached. Descent is accomplished by lowering the foot platform to a convenient height, then standing on said foot platform while again lowering the seat platform to a convenient height immediately above the foot platform and repeating the process until descent has been accomplished.

10 Claims, 5 Drawing Figures

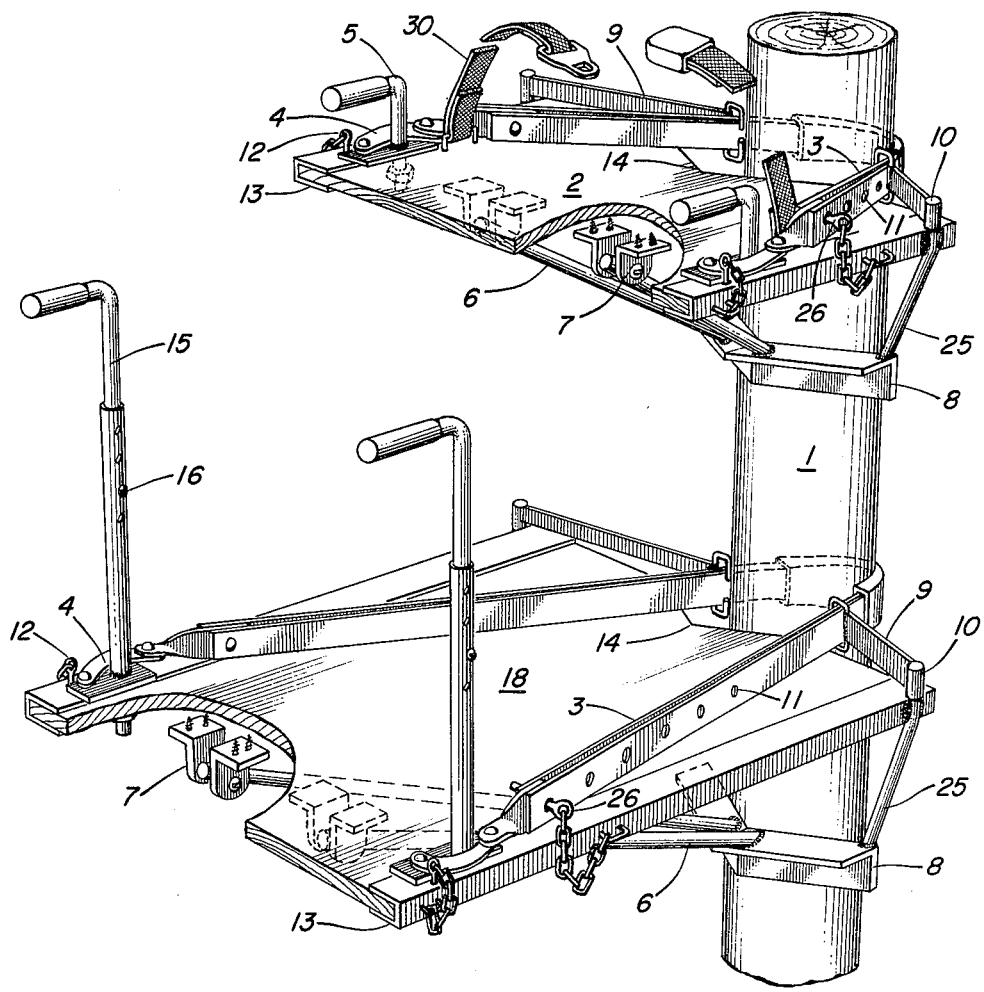
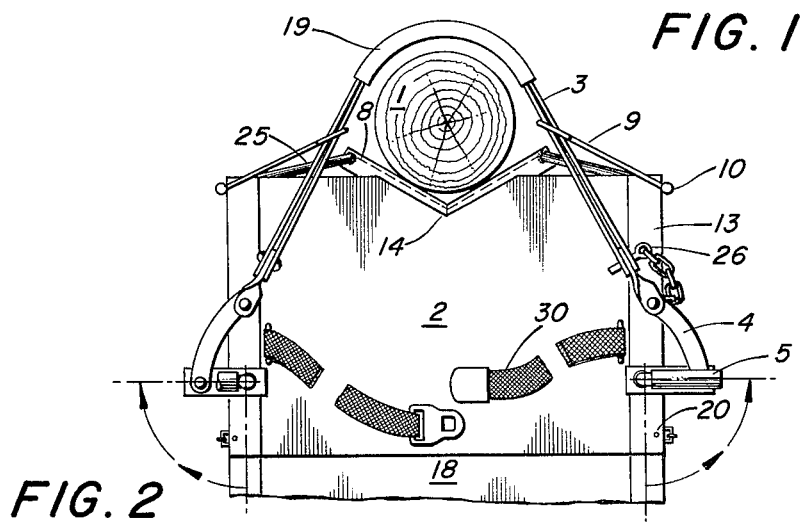

SUPPORT PLATFORM FOR VERTICAL POLES OR TREES

This invention relates to portable tree or pole maintenance, surveyance, sniping or hunting platforms. More particularly, this invention relates to a platform which allows the ascent of substantially vertical poles or trees by alternately sitting and standing and drawing upward to a convenient height the section which is not being sat or stood upon. Descent is accomplished by simply reversing the process.

Uses for platforms to support workers or hunters on substantially vertical poles or trees have long been known in the art. The prior art is represented by U.S. Pat. No. 1,187,078 which shows a portable lineman's pole to allow a workman to stand high on a pole and use both hands freely. However, the platform must be raised by a rope and pulley arrangement or by someone who has first climbed the pole and raised the platform to the desired height. U.S. Pat. No. 2,991,842 shows a portable seat which is removably mounted on a post or a tree trunk as a table, depository for goods away from pests, or a seat at or near ground level. U.S. Pat. No. 3,338,332 relates to a deer stand which is connected to the trunk of an upperly extending tree, including U-shaped bracing elements and downward extending braces to provide rigidity. However, the platform first requires that the tree be climbed and that the platform be thereafter hoisted to a position which has been selected for the platform. In addition, the platform is inflexible in that branches would prevent its complete ascention to the height desired.

These problems were partially overcome by U.S. Pat. No. 3,460,649 which shows a tree climbing/hunting platform which is in one section and which is lifted by the hunter using his feet. Briefly, this invention relates to straps which hold the hunter's feet to the platform stand, the hunter then using his hands and arms to physically lift the platform attached to his feet to a slightly higher position, then repeating the process with a fresh grip further up the tree. Disadvantages of such an operation are obvious, since the hunter must lift the weight of the platform while hanging precariously to an insecure grip on a smooth tree trunk, or branches. In addition, the apparatus is inflexible in that at a certain height the platform begins to tilt outward away from the tree, becoming unsafe.

It would therefore be of great benefit to provide an apparatus for use on substantially vertical poles or trees which would provide safety, convenience, and ease of climbing with equal ease of descent. The device should be simple, easily used, and safe.

It is therefore an object of my invention to provide an apparatus for use on substantially vertical trees or poles which is portable, can be moved from point to point, and provide adjustment of position around the circumference of the tree or pole as desired by the user. Other objects will become apparent to the users of such apparatus as the description proceeds.

These objects are accomplished by my invention, which provides an apparatus for use on substantially vertical poles, comprising two sections which cooperate in ascending and descending said vertical poles, comprising:

(a) an upper section comprising a seat member having handle members attached thereto; gripping means removably and adjustably secured to said seat member; a brace member supporting said seat member, attached at one end to the underside of the seat member and at the opposite end contacting said pole, whereby application of force to the seat member increases the contact of the brace member with said pole; and (b) a lower section comprising a foot platform having handle members attached thereto; gripping means removably and adjustably secured to said foot platform; and a brace member attached at one end beneath said platform and at the opposite end in contact with the pole, whereby application of force to the foot platform increases the grip of the foot platform on said poles.

The apparatus is simple to use and provides a high degree of safety, reliability, and convenience not shown in any of the previous methods. Briefly, the method of ascending the pole or tree is by drawing the lower section to a convenient height below the seat section and standing on the lower section and raising the seat section to a convenient height; then again sitting upon the seat section and repeating the process until the desired height is reached.

Figure 4:
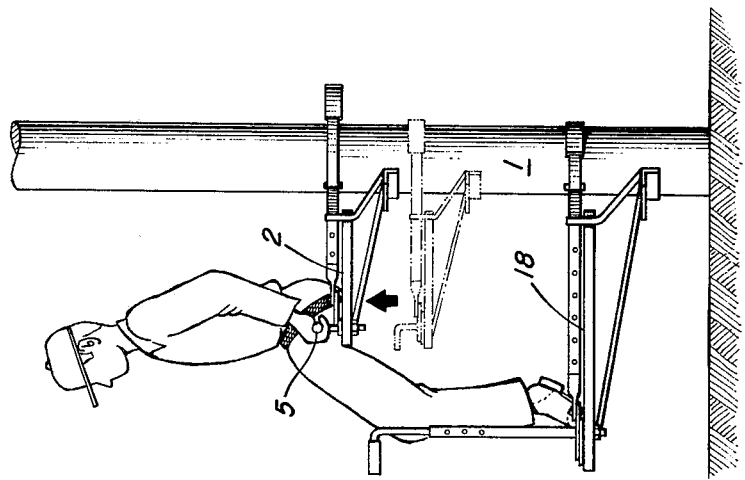
Figure 3:
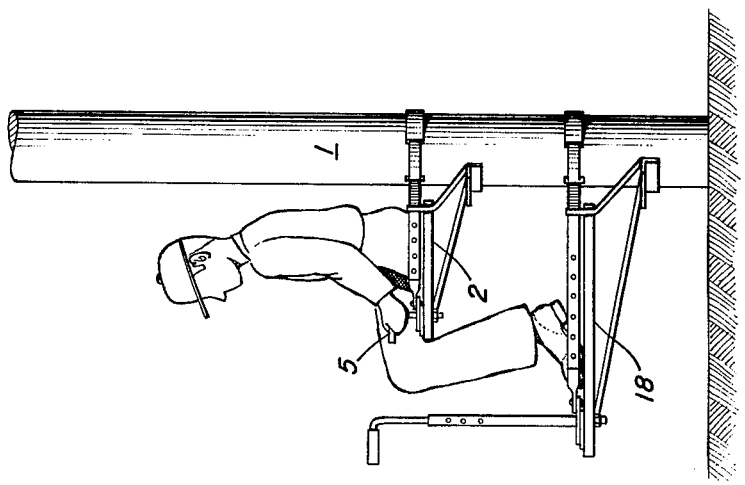

The invention is more completely described with reference to the figures, of which FIG. 1 shows the upper and lower sections of the instant apparatus in position for ascending the pole. FIG. 2 is an upper view looking down on the apparatus described in FIG. 1. FIGS. 3, 4, and 5 illustrate the apparatus in use during ascent of a pole.

Specifically, FIG. 1 describes a pole (1) having mounted thereon the apparatus of the instant invention. The upper seat section (2) is connected to adjustable removal gripper means (3) which are tightened using tensioning means (4) controlled by the handles (5). The seat means is provided with a brace (6) which has one end fastened to and supporting said seat (7) and the other end contacting said pole or tree (8), said contacting preferably but not critically being done in the form of a V-shaped bar or angle such that varying diameters of the pole or tree can be easily accommodated. The brace (6) is maintained in position by means (25) which can be flexible rope or chain or stiff metal or wooden rods. The gripping means (3) are positioned by positioning means (9) which prevent the gripping means from becoming displaced. The positioning means pivot (10) to allow automatic positioning of the gripping means (3) at the edge of the tree or pole, allowing trees and poles larger in diameter than the width of the platform. The gripping means are adjusted by adjusting means (11) which provide for removal or adjustment of the gripping means so as to bypass branches or to accommodate varying diameters as the pole or tree is ascended. Preferably, clip pins (26) are used to speed adjustment, although bolts and wing nuts can be used. In the preferred embodiment, safety lock pins (12) are likewise provided in order that the tensioning means (4) are not inadvertantly placed in an open position, thereby decreasing tension and grip of the platform on the pole or tree. The platform is normally edged with angle iron or sheath iron (13) and is normally notched or cut out (14) adjacent the pole or tree. The seat member is optionally provided with a safety restraint (30).

The foot platform is of essentially the same construction as the upper seating section with the exception that the handles are extended (15) and are provided with adjusting means (16) to allow maximum height adjustment suitable to particular user, and allow a speedy, comfortable, and convenient ascent or descent. The lower foot platform (18) is normally larger than the upper seating platform (2) but can be of any convenient size.

FIG. 2 is a detailed upper view of the apparatus of the instant invention as seen from above during ascent or descent. In addition, this view more clearly shows the optional covering on the gripping mean (19) which can be of cloth, rubber, or a metal covering dependent upon the composition of the vertical pole or tree to be climbed. Normally, a rubber or a elastomeric covering will be provided for metal poles, as will the facing of brace (8). Such coverings will also avoid damage to the tree. In addition, the view more clearly shows the safety pin holes (20) in an open or unused position during the release of tension for the ascent or descent of the platform in use.

FIGS. 3, 4, and 5 in sequence illustrate the use of a platform during the ascent of a vertical tree or pole.

FIG. 3 shows the initial starting position wherein the lower foot platform is positioned with the upper seat platform above. In FIG. 3 the operator is standing on the foot platform (18) and has grasped the handles (5) in order to make the ascent. In FIG. 4 the operator has handles (5) in a non-tensioned position and has, using the handles, raised platform (2) into a more elevated position. This position is any elevation convenient to the individual operator and, as will be appreciated, can vary greatly. In FIG. 5 the operator has resumed his seat on platform (2) and has grasped handles (15) of lower foot platform (18) and has raised it to a convenient position immediately below seating platform (2). The operator then repeats the procedure until the desired level of ascent has been reached. In descending the pole or tree, the sequence of the figures is 5; 4; 3; until the base of the pole or tree has been reached.

It will be appreciated that the gripping means of each section of the instant apparatus are provided with adjustable means to accommodate varying pole sizes at differing elevations on the pole. For example, many trees and poles have a severe taper, especially if of extreme height. In the normal use of my invention, the platform would begin near the ground at an angle inclined sharply from the front of each section toward the pole. This angle would tend to decrease as the diameter of the pole or tree decreased with height. Once either platform has reached a substantially horizontal position, the operator, through the use of adjusting means (11) can stand or sit on the platform while adjusting the other platform to the new circumference of the pole. This adjustment is normally accomplished using any convenient fastening means such as quick change pins, nuts, bolts, or other such fastening means. This release of the gripping means also allows the convenient bypassing of limbs when trees are ascended. The terms "pole" and "tree" are interchangeable for the purposes of my invention.

Likewise it should be noted that the bases (8) of the braces (6) are preferably V-shaped brackets, normally made of angle iron or other convenient material and provide a firm contact with varying diameter trees or poles. If poles are to be ascended rather than living trees, V-shaped brackets can be provided with serrations to improve pole contact and grip, or faced with rubber or the like with metal poles. However, such serrations are not necessary and would normally not be used when ascending living trees in order to avoid damage to the tree.

Tensioning means (4) are provided in my invention in order to more securely position the platforms while providing means for easy ascent and descent of the tree or pole. In the platforms actually constructed and tested, the left hand uses a clockwise rotation to lock the tensioning means while the right hand toggle uses a counter-clockwise motion to lock the tensioning means. Simple reversal of these motions will unlock the tensioning means and allow easy movement up and down the pole or tree. After movement of the platform, a simple twist of the wrist will lock the tensioning means in place, providing a secure grip for the platform and providing safe use while the alternate platform is being lowered or raised. In addition, optional safety pins are provided to lock the tensioning means in a closed position between movements of the platform or while in use as in hunting or maintenance of pole mounted utilities.

In addition, the extended handles of the lower foot platform are useful in order that the operator can reach the handles, release tension, and move the platform to a new position during ascent or descent of the tree or pole. In order to accommodate the differing anatomical characteristics of the various operators, adjusting means (16) are provided in order that the handle height may be adjusted to the requirements of the individual operator.

It is naturally preferred that the materials of the instant apparatus be those most suitable to light weight, safety, and convenience. For these reasons, it is preferred that the platforms (2) and (18) be constructed of a light weight, firm material such as plywood or fiberglass and that the frame and brace members be constructed of light weight metal such as aluminum. However, it should be realized that common channel iron is perfectly suitable for such uses, although an increase in weight will be apparent.

The gripping means (3) of the figure can likewise be of any suitable material such as strap iron, band iron, or various fibers such as nylon, polyaramid, and so forth. In addition, member (3) can, instead of conforming smoothly to the circumference of the pole or tree, have a V-shape contacting means in opposition to brace means (8) of the figures. However, such an apparatus would place greater force upon a smaller area and would damage trees. Such a gripping means would be suitable for poles or other inanimate objects. In addition, sheath (19) as shown in FIG. 2, can be composed of elastomers such as rubber or fibers such as aramid or nylon.

The apparatus of the instant invention likewise allows the user to change his orientation on the pole or tree when the desired height has been reached by the simple expedient of releasing tension upon one platform, turning it circumferentially around the tree or pole to the extent convenient, returning tension to the platform, and doing the same to the remaining platform. This operation is repeated in increments until the desired orientation upon the tree or pole is reached.

In addition, the upper seat platform can be provided with a safety belt or restraining means in order to allow greater freedom of movement during ascent and descent of the platform. The lower platform is optionally provided with means for fastening said platform to the upper seat platform during disconnection of the adjusting means (11) and the gripping means (3) in order to pass the lower platform around proturberances such as limbs, knots, or other non-circumferential items upon the pole or tree.

While certain embodiments and details have been shown for the purpose of illustrating this invention, it will be apparent to those skilled in this art that various changes and modifications may be made herein without departing from the spirit or scope of the invention.

I claim:

1. An apparatus for use on substantially vertical poles, comprising two sections which cooperate in ascending and descending said vertical poles, comprising:
   (a) an upper section comprising a seat member having handle members attached thereto; said handle members connected to flexible gripping means removably and adjustably secured to said seat member; a brace member supporting said seat member, attached at one end to the underside of the seat member and at the opposite end contacting said pole, whereby application of force to the seat member increases the contact of the brace member with said pole; and
   (b) a lower section comprising a foot platform having handle members attached thereto; said handle members connected to flexible gripping means removably and adjustably secured to said foot platform, and a brace member attached at one end beneath said platform and at the opposite end in contact with the pole, whereby application of force to the foot platform increases the grip of the brace member on said pole; whereby the pole is ascended by drawing the lower section to a convenient height below the seat section, then standing on said lower section and raising said seat section to a convenient height and repeating the process until the desired height is reached.

2. An apparatus as described in claim 1 wherein both upper and lower section handle members are provided with tensioning means to improve contact with said pole.

3. An apparatus as described in claim 2 wherein said gripping means of each section are provided with adjustable means to accommodate varying pole sizes at differing elevations on said pole.

4. An apparatus as described in claim 3 wherein the end of the bracing means of each section in contact with said pole is a V-shaped bracket to accommodate varying pole sizes.

5. An apparatus as described in claim 4 wherein said V-shaped bracket is provided with serrations to improve pole contact.

6. An apparatus as described in claim 3 wherein said tensioning means are metal straps and said adjusting means are clip pins.

7. An apparatus as described in claim 3 wherein the metal band gripping means are covered with rubber to improve adhesion on metal poles.

8. An apparatus as described in claim 3 wherein the upper section is provided with a restraining means for safety.

9. An apparatus as described in claim 8 wherein the lower section is provided with attachment means to support the lower platform from the upper platform during readjustment of the gripping means.

10. An apparatus as described in claim 8 wherein the apparatus is used to ascend trees or poles larger in diameter than the width of the platform.

* * * * *